United States Patent
Berends

(10) Patent No.: US 6,209,857 B1
(45) Date of Patent: *Apr. 3, 2001

(54) BUMPER DEVICE

(75) Inventor: Jan Berends, Buitenpot (NL)

(73) Assignee: Stertil B.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,678

(22) Filed: Jun. 29, 1998

(30) Foreign Application Priority Data

Jun. 30, 1997 (NL) .................................. 1006432
Oct. 13, 1997 (NL) .................................. 1007262

(51) Int. Cl.⁷ .............................. B65G 69/00; E04F 19/00
(52) U.S. Cl. ...................... 267/140; 267/141; 267/153; 52/173.1
(58) Field of Search ..................... 267/139, 140, 267/116, 141, 152, 153, 140.5; 293/120, 136, 121, 155, 122; 256/13.1, 14; 404/6; 114/219; 52/173.1, 173.2, 27; 405/212, 215, 216; 188/371–977, 268; 16/86 A; 213/221; 14/71.1, 71.3, 71.5, 69.5; 248/615, 616, 345.1; 414/401, 396; 428/68

(56) References Cited

U.S. PATENT DOCUMENTS

| | | | |
|---|---|---|---|
| 3,365,189 | * 1/1968 | Carlson | 188/268 |
| 3,680,851 | 8/1972 | Takada | 267/140 |
| 3,734,554 | * 5/1973 | Schwabenlender . | |
| 3,741,560 | * 6/1973 | Schaller | 213/221 |
| 3,804,446 | * 4/1974 | Warrener | 188/268 |
| 3,865,358 | * 2/1975 | Butters | 267/140 |
| 3,935,684 | * 2/1976 | Frommelt et al. | 52/173.2 |
| 3,991,537 | * 11/1976 | Brown . | |
| 4,082,338 | * 4/1978 | Hutai et al. | 267/140 |
| 4,096,927 | * 6/1978 | Takatsu | 188/268 |
| 4,319,539 | * 3/1982 | Fujii et al. | 267/140 |
| 4,349,992 | * 9/1982 | Layne | 52/173.2 |
| 4,548,150 | * 10/1985 | Drewett | 267/140 |
| 4,807,915 | * 2/1989 | Shyi | 267/139 |
| 4,854,258 | 8/1989 | Hausmann et al. | 114/219 |
| 5,139,297 | * 8/1992 | Carpenter et al. | 293/136 |
| 5,252,376 | * 10/1993 | Greenberg et al. . | |
| 5,658,633 | * 8/1997 | Dibiase | 114/219 |
| 5,661,934 | 9/1997 | Weisflog | 52/173.2 |
| 5,775,044 | * 7/1998 | Styba et al. | 52/173.2 |
| 5,881,414 | * 3/1999 | Alexander | 14/71.1 |
| 6,006,389 | * 12/1999 | Alexander | 14/71.1 |
| 6,120,871 | * 9/2000 | DeBiase | 114/219 |

FOREIGN PATENT DOCUMENTS

| | | | |
|---|---|---|---|
| 32 24 123 | 12/1983 | (DE) | E02B/3/22 |
| 3242511 | * 5/1984 | (DE) . | |
| 888986 | * 1/1999 | (EP) . | |
| 1151606 | * 6/1956 | (FR) . | |

* cited by examiner

Primary Examiner—Douglas C. Butler
(74) Attorney, Agent, or Firm—Mark Zovko

(57) ABSTRACT

The present invention relates to a bumper device which is to be mounted on a stationary object to absorb a shock in the case a vehicle collides against the object, comprising at least one body of resilient material; and, at least on the front part of the body, a closed and flat front element of material with a low coefficient of friction in the case of contact with material of the vehicle.

15 Claims, 2 Drawing Sheets

BUMPER DEVICE

The present invention relates to a bumper device which is to be mounted on a stationary object to absorb a shock in the case a vehicle collides against the object.

According to the known art a bulky block of rubber is generally fixed to the wall in question, for instance using bolts which are fastened in the wall in countersunk position in the rubber. Protection is provided by the rubber both to the wall and the vehicle which can bump against it.

The drawback of the known art is that the known bumper device is unprotected, i.e. while the bumper device consisting of a block of rubber provides the desired protection against the shocks or impacts in the travel direction of the vehicle, the bumper device itself incurs damage, particularly when the vehicle does not drive exactly straight onto the known bumper device, and more particularly when the vehicle moves up and downward under the influence of the suspension thereof, for instance during loading and unloading. These conditions have a destructive effect on the bumper device, wherein the block of rubber is ripped apart such that it will have to be replaced after a short time. The associated cost in labour and material is high.

A further drawback is that not only must the bumpers be replaced, but frequently the anchoring bolts as well, because the rubber material is highly compressible and friction forces caused by the vehicle are hereby transmitted to the bolts, the heads of which are located at a distance from the relevant wall. As a result these bolts can bend, break or even be pulled entirely out of the relevant wall. This latter is only possible a limited number of times since too many holes will have to be drilled in the concrete for new bolts.

It is otherwise also known to make use of a contact element of steel or metal which has some freedom of movement in the case of a collision or contact with a vehicle. This known device has the main drawback however that a coefficient of friction between objects of metal which are in mutual contact is still very high, so that great forces are exerted on the device. Such a known device is provided with a stop for blocking movement of the contact element in a downward direction, which corresponds with loading of a vehicle, and does not have a symmetrical form in the case of rotation as seen in front view or reversal of the contact element, so that it cannot withstand very well the friction forces occurring during unloading of a vehicle, and that in the case of damage thereto the contact element must certainly be replaced since no other option is available for the positioning of this contact element.

According to the invention a bumper device is provided with which the above stated drawbacks are obviated. To this end there is provided a bumper device with at least one body of resilient material; and, at least on the front part of the body, a closed and flat front element of material with a low coefficient of friction in the case of contact with material of the vehicle.

The front element herein serves to protect the body of resilient material which can be formed for instance from a block of rubber or a number of springs, which are per se very sensitive to the above mentioned up and downward movement of the vehicle, for instance during loading and/or unloading thereof.

A bumper device according to the present invention preferably comprises a base on the rear side of the body. In this way the body is enclosed between the base and the front element, which results in a simple and reliable configuration.

The base is preferably plate-like with at least two side edges distributed round the periphery thereof, wherein the side edges enclose sides of the front element in close-fitting manner. In this way a movement other than that of the base and the front element away from and toward each other is limited and preferably even wholly eliminated. In order to still enable the movement of the base and the front element away from and toward each other, a bumper device according to the present invention is such that the side edges comprise engaging means which act on the front element with clearance, wherein the base and the front element are movable toward and away from each other.

In addition, a bumper device according to the present invention is preferably such that the base can be arranged on the object with fixing means, so that in this manner the fixing takes place using a preferably hard and stiff element and not, as in the known art, through a soft and compressible material. It is preferably the case here that an outer end of the side edges forms a stop with which the space available for relative movement of the base and the front element is limited. The thus formed stop defines the space available for the relative movement and limits it. It will be possible during use to reach the extreme position predetermined by the stop, wherein the energy of the collision of the vehicle with the bumper device is largely dissipated prior thereto by the resilient body.

In another preferred embodiment a bumper device according to the present invention is such that the base is plate-like, at least one side edge of which is folded, and the side edge and a closing element to be releasably connected to the base enclose the front element in close-fitting manner. During assembly of the bumper device according to the invention the front element can in this way be positioned simply relative to the base already fixed to the object prior thereto, wherein the body is situated between the base and the front element, whereafter the closing element is arranged to subsequently enclose the front element in close-fitting manner and hold it in place. A simple exchange of a damaged front element with a new one is hereby realized. A damaged front element can thus also be reversed in simple manner to provide a less battered surface on the front for collision with or sliding off of the vehicle.

Other properties of a bumper device according to the present invention will become apparent from the following description of an embodiment. In the drawing.

Figure 1:
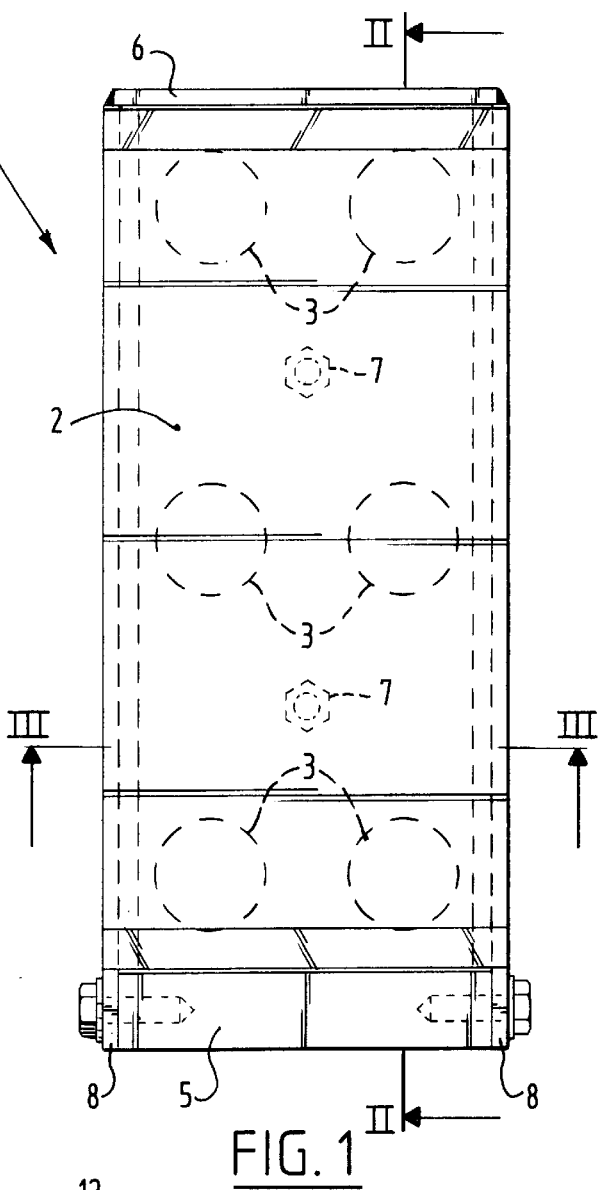
FIG. 1 shows a front view of a bumper device according to the present invention.

In the front view of the bumper device according to the present invention shown in FIG. 1, bumper 1 comprises a cover plate 2 which is placed against resilient elements 3 of for instance rubber. Cover plate 2 is manufactured in the embodiment shown here from UHMWPE, or ultra high molecular weight polyethylene, but can alternatively be manufactured from a random wear-resistant material which has a low coefficient of friction in the case of contact with metal, such as of the vehicle which is placed against bumper 1 and can slide thereover during loading or unloading.

A block 5 of steel or other metal is arranged on the underside of the cover plate, as will be further described below with reference to FIG. 2.

Figure 2:
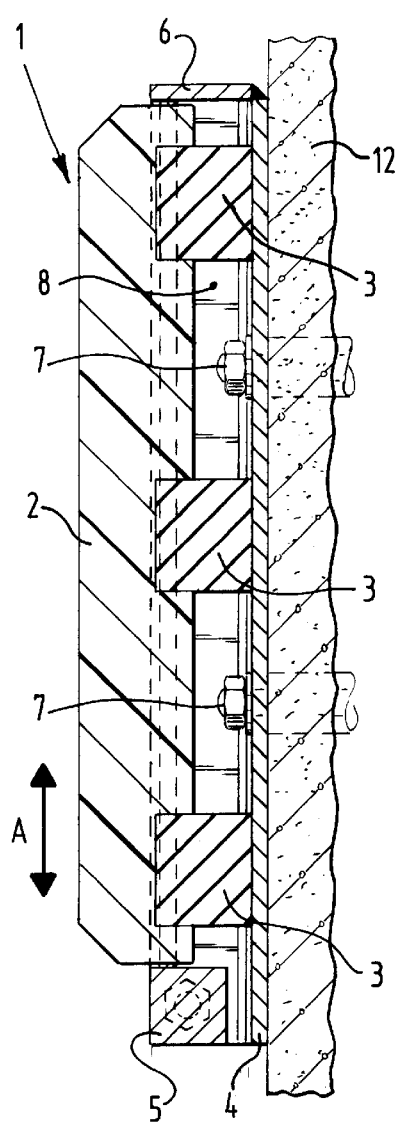
FIG. 2 shows a side view in cross-section of the bumper device shown in FIG. 1.

The side view in cross-section along the line II—II of FIG. 1 depicted in FIG. 2 shows that cover plate 2 is connected to a base plate 4 with interposing of the resilient elements 3 which are manufactured for instance from rubber. During use of bumper 1 this base plate 4 is fixed to the relevant wall, for instance by means of bolts 7 as described below with reference to FIG. 3. Alternatively or additionally, the base plate can be welded to an L-profile cast into the concrete of the relevant wall when the base plate is manufactured from metal.

In the embodiment shown here, the resilient elements 3 are rod-shaped and protrude partly into recesses in the side of cover plate 2 directed toward base plate 4. The rod-shaped elements thus connect close-fittingly onto cover plate 2 in the recesses on one side and onto base plate 4 on the other side.

On the underside of cover plate 2 the block 5 is arranged to enclose cover plate 2 between this block 5 on the underside and a folded element 6 on the top of base plate 4. This ensures that bumper 1 can withstand vertically directed load in the direction of arrow A when a vehicle pressing against cover plate 2 undergoes a vertical movement as a consequence of the loading and/or unloading thereof. The vehicle simply slides over the very smooth cover plate 2. With a bumper device according to the known art the vertical movement would result in wear and even ripping of unprotected rubber.

Forces in the direction of arrow A are herein absorbed by block 5 or by folded element 6, which ensure that cover plate 2 remains in the original position relative to base plate 4 when a force is exerted on cover plate 2 in vertical direction along arrow A.

Cover plate 2 is in the first place manufactured from a very strong material to be able to withstand impacts and shocks during positioning of the vehicle against it, wherein cover plate 2 also has a very low coefficient of friction, particularly in respect of the material of the vehicle which comes to be in contact therewith.

The vehicle will therefore substantially slide over cover plate 2 when it undergoes an up and/or downward movement in the direction of arrow A during loading and/or unloading.

Figure 4:
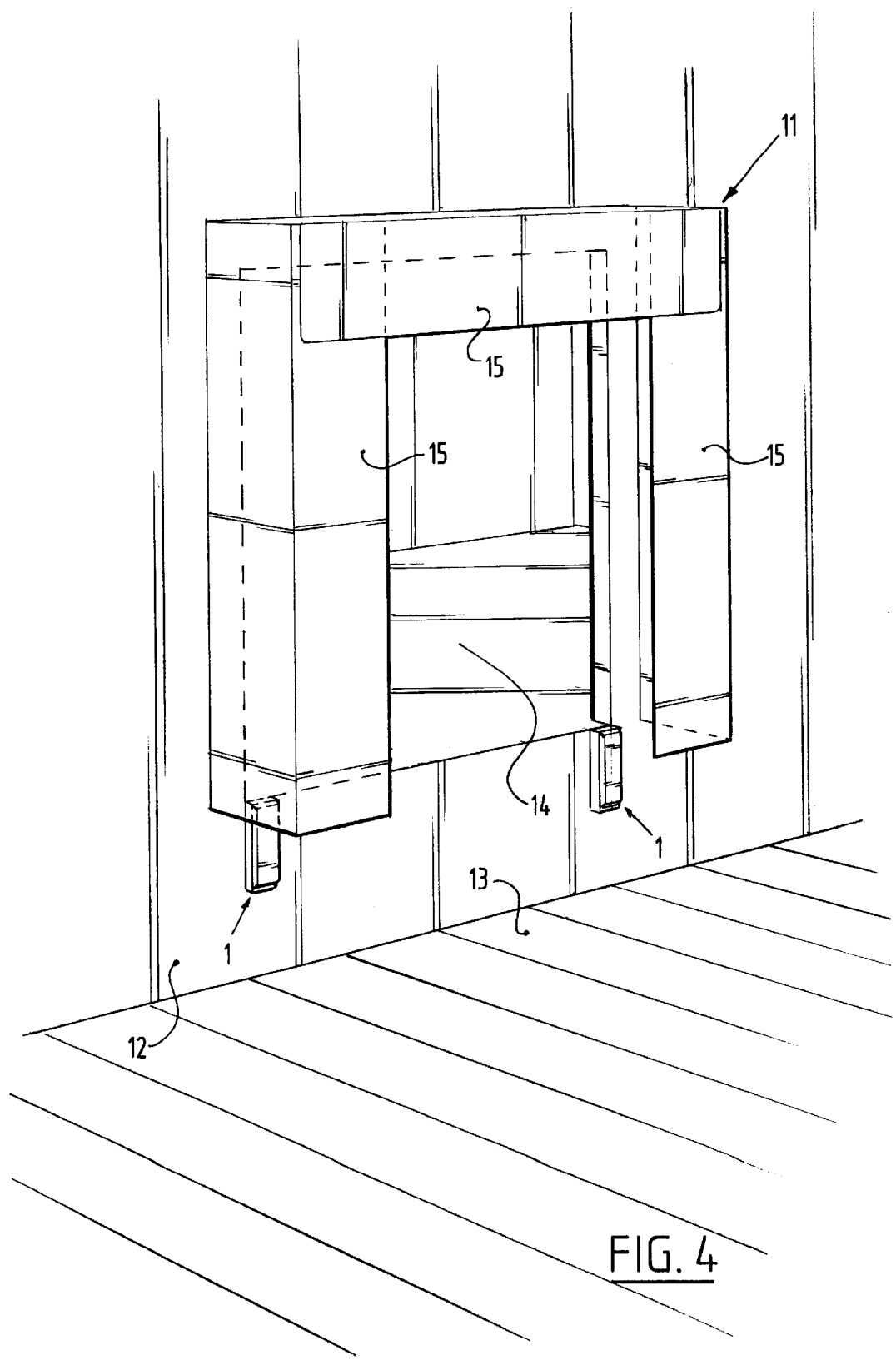
FIG. 4 shows a possible application of a bumper device according to the present invention.

Block 5 is arranged on the underside in order to enable at least cover plate 2 to slide over the base plate, whereafter block 5 is arranged and fixed. The desired situation is herein also brought about, wherein the bumpers, as shown in FIG. 4, can be placed with the top side thereof very close to the edge of the opening, without this being prevented by the block 5 functioning here as closing member. The block is otherwise preferably placed such that cover plate 2 is enclosed in close-fitting manner between this block 5 and the folded element 6, this such that there remains only a freedom of movement of the cover plate in horizontal direction. In vertical direction the vehicle must slide off over cover plate 2.

Figure 3:
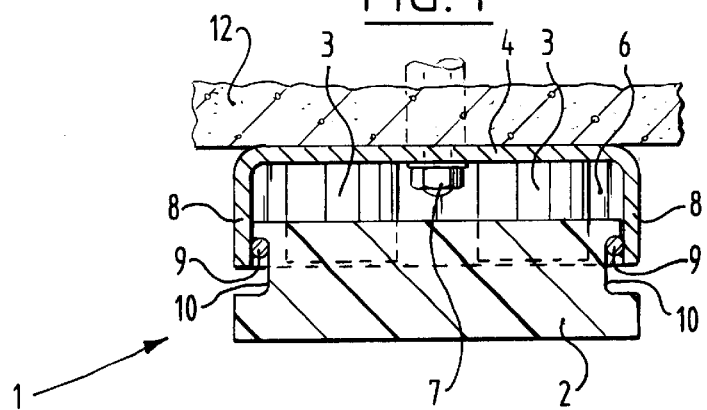
FIG. 3 shows a view in cross-section from another direction along lines III—III of the bumper device shown in FIG. 1.

The bottom view depicted in FIG. 3 in cross-section along the line III—III of FIG. 1 shows among other things one of the bolts 7 already mentioned with reference to FIG. 2. These bolts 7 are at a distance from cover plate 2 during positioning of the vehicle relative to the wall, and therefore relative to bumper 1. This distance is preferably at least slightly greater than the space in which cover plate 2 can move relative to the folded side edge parts 8 of base plate 4. Damage to cover plate 2 is hereby minimized in effective manner and the force released during a collision is absorbed on the outer ends of side edges 8 over the whole periphery thereof.

The folded side edge parts 8 are each provided on the side thereof directed toward the interior of bumper 1 with a hook member, here in the form of sliding rod 9 which is located in a recess 10 in cover plate 2. The recess 10 in cover plate 2 is herein also made wide such that sliding rod 9 cannot be pressed therefrom when a vehicle is positioned against cover plate 2, since the width of recess 10 is greater than or equal to the freedom of movement of cover plate 2 defined by the ends of the folded side edge parts 8 designed as stop elements. The combined action of recess 10 and sliding rod 9 further serves to enhance the assembly described with reference to FIG. 2.

A device is described in the foregoing with reference to FIGS. 1–3 wherein use is made of a cover plate 2 which is designed for turning such that cover plate 2 can be turned over in the front view of FIG. 1, wherein the top part comes to lie at the bottom and the bottom part at the top. When the undesired damage to the front surface of cover plate 2 begins to assume serious proportions such that the operation thereof is hereby impeded, it is possible to turn over cover plate 2 in the above stated manner, which can be effected quickly and simply by temporarily detaching the block 5 in FIG. 1, sliding cover plate 2 in downward direction out of the device 1 and turning it over in the above described manner prior to reintroducing this cover plate 2, whereafter the block can once again be arranged. The foregoing is therefore possible as a result of the symmetry occurring relative to the axial line in length direction of cover plate 2, wherein cover plate 2 can be rotated in the above described manner through 180° in order to provide a substantially identical front surface. It is noted in this respect that if the device 1, and herewith cover plate 2, were substantially square, the above mentioned rotation symmetry would apply in steps of 90°. It will be seen from the foregoing that a simple replacement of cover plates 2, or a new orientation thereof relative to the vehicles colliding therewith, is easy to achieve, also with forms other than the rectangular form described above with reference to the figures and the square form only briefly mentioned.

When the front side and rear side of cover plate 2 have substantially the same design, it is also possible to turn the cover plate round such that the rear side is directed forward and the damaged front side faces to the rear, whereby a "new" front surface of a "new" cover plate 2 is provided for bumping of the vehicles thereagainst. Essential in all these options for turning over, turning round and rotating of cover plate 2 is that release thereof can take place in simple manner, wherein the same applies for replacing of the cover plate, which is brought about using block 5 as shown in FIGS. 1 and 2. Just loosening two bolts is sufficient to remove the block and leave the way clear to remove cover plate 2. The cover plate can then be turned over or turned round in one or other manner as described above, or use can be made of an entirely new cover plate 2 which is for instance held in stock for this purpose. Block 5 can subsequently be arranged once again, wherein the whole procedure of turning over, turning round or replacing cover plate 2 need only take a few minutes.

FIG. 4 shows a possible application of bumper devices according to the present invention. In the application shown here, two bumpers 1 are fixed to a wall 12, in which wall an opening 14 is arranged for loading and/or unloading of a vehicle such as a truck. Arranged round opening 14 is a so-called shelter 11 which consists mainly of fixed sheeting 15 which offers protection against the weather elements during loading and/or unloading. Situated behind opening 14 is a shed or storage area from which the vehicle can be loaded or where freight coming from the vehicle can be stored. A vehicle is herein driven over road surface 13 to the opening 14 in wall 12.

When a vehicle such as a truck has to be loaded and/or unloaded, it is driven in rearward direction to the passage 14. Sheeting 15 of shelter 11 herein connects onto the rear of the truck so that the driver loses sight of the wall 12 in which is situated the opening 14 relative to which the driver wishes to position his truck. The danger arises here of damage being caused to the wall and/or the truck if the latter backs up too far. Bumpers 1 are arranged to prevent this.

Bumpers 1 can be situated at a number of locations and in the application shown here are arranged in wall 12 directly beneath the bottom edge of opening 14. The dimensions of bumpers 1 are such that vehicles such as trucks of different dimensions can drive against bumpers 1 with the bottom part of the loading space or other suitable position without the danger of these parts of the vehicle being able to come into contact inadvertently with wall 12 above or below bumpers 1 when the truck travels in reverse over road surface 13 in the direction of opening 14. It is therefore the vertical dimension of bumpers 1 which is of the main importance.

Many other embodiments are possible within the scope of the present invention in addition to that described above. Use can further be made of springs or other similar components instead of the rubber resilient elements according to the description. Instead of the six resilient elements 3 as described in the foregoing, use can also be made of differently formed elements such as elongate, parallel extending elements of resilient material. Also possible is a single block-like element which extends substantially over the whole surface corresponding with the space between the front element and the base plate. Many other variants are also possible. It is however important here, particularly in respect of the reversibility of the plate and the convenience of detaching and replacing thereof, that the body or the bodies of resilient material, where they are not connected to the front element, can be arranged on the base, this prior to positioning of the front element. The base is provided for this purpose with for instance pins and the body or the bodies can be equipped with holes corresponding with the pins. The body or the bodies can in this way be fixed to the base, in the above described and shown embodiment prior to "sliding-in" of the cover plate. Other fixing means are also possible within the scope of the present invention. Instead of the folded element applied in the described embodiment, a block of material can be arranged on the top of the cover plate in similar manner as on the underside. The base plate is herein enclosed in vertical direction between the blocks. According to the above description of an embodiment, the bolts are further positioned along the central vertical longitudinal axis. Additionally or alternatively, at least one pair of bolts designed as stop elements can be arranged on the base plate along a horizontal axis in width direction. Use can further be made of another method of fixing the base plate, for which no bolts are required. An already mentioned example is welding of the base plate to an L-profile cast into the concrete of the relevant wall. Separate stop elements can also be applied instead of or in addition to the base plate forming the stop element, wherein diverse dimensions are adapted hereto, such as the width of the recess in the cover plate with which the maximum compression of the resilient elements between the base plate and cover plate is defined.

Many more other embodiments can otherwise be envisaged which will occur to the skilled person after perusal of the foregoing.

What is claimed is:

1. A bumper device mounted to a wall to absorb repeated shocks from a moving object colliding against the wall comprising at least one body of resilient material, said body of resilient material having a front side and a rear side, and a closed and flat front element having sides, said front element adjacent to the front side of said body of resilient material, and a base plate, said base plate having a periphery with at least two side edges distributed around the periphery wherein said side edges of said base plate enclose said sides of said front element in a close-fitting manner, and said front element composed of a material with a coefficient of friction when contacting the moving object less than that of metal contacting metal to reduce the force generated on the device when the moving object is contacting said front element and moving in a direction substantially parallel to the wall.

2. The bumper device of claim 1 wherein said side edges of said base plate contain engaging rods which act on said front element with clearance, so that said front element is moveable toward and away from said base plate.

3. The bumper device of claim 1 wherein said base plate is arranged on the wall with fixing means.

4. A bumper device as claimed in claim 1 wherein said base plate has a least one side edge, and said side edge and a closing element connected to said base enclose said front element in a close-fitting manner.

5. A bumper device as claimed in claim 1 wherein said side edges of said base have an outer end, and said outer end of said side edges forms a stop whereby the space available for relative movement of said base and said front element is limited.

6. Bumper device as claimed in claim 1 wherein said front side element has a side remote from said base plate and only said side remote from said base is made of a material with a low coefficient of friction.

7. Bumper device as claimed in claim 1 wherein said front element is manufactured from a wear-resistant, hard plastic.

8. The device of claim 7 wherein said plastic is an ultra high molecular weight polyethylene (UHM-WPE).

9. A bumper device as claimed in claim 1 wherein said front element has in front view of the device a rotation-symmetrical form at n/2 180°.

10. A bumper device as claimed in claim 9 wherein said front element has a periphery and said periphery of said front element in front view is square, and n=0, 1, 2, . . . .

11. A bumper device as claimed in claim 9 wherein the periphery of said front element in front view is rectangular, and n=0, 2, 4, . . . .

12. A bumper device as claimed in claim 1 wherein said front element has a front and rear side, said front element being reversible and said front side and rear side having substantially the same form.

13. A bumper device as claimed in claim 1 wherein said body of resilient material is manufactured from at least one rubber block.

14. A bumper device as claimed in claim 1 wherein said body of resilient material is manufactured from at least one spring.

15. A bumper device as claimed in claim 1 wherein said base plate is manufactured from metal and plastic.

* * * * *